United States Patent Office 3,579,359
Patented May 18, 1971

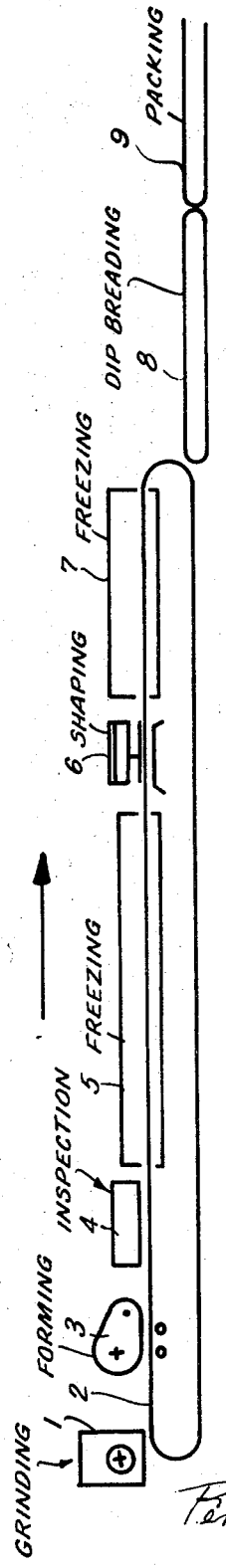

3,579,359
METHOD FOR PRODUCTION OF DEEP FROZEN FISH PRODUCTS
Eiler Schjolberg, Reinslettveien 32, Bodo, Norway
Filed Mar. 26, 1968, Ser. No. 716,055
Claims priority, application Norway, Apr. 5, 1967, 167,593
Int. Cl. A23b 3/00, 3/06
U.S. Cl. 99—195          3 Claims

ABSTRACT OF THE DISCLOSURE

The invention relates to a method for production of foodstuffs in the form of deep frozen, shaped products, for example, the so-called fish sticks, grill fingers, breaded portions and similar substantially processed products, produced from fish or other raw materials, in which the raw material is ground to a mass consisting of grain size particles, formed into a band-like product and frozen to a consistency and temperature suitable for portioning, whereafter portioning into shaped portions is carried out and the said products are further frozen to the desired keeping temperature.

---

The invention relates to a method for production of foodstuffs in the form of deep frozen, shaped portions, for example, the so-called fish sticks, grill fingers, breaded portions and similar substantially processed products, produced from fish or other raw materials.

At the present time the production of such deep frozen products is undertaken by first forming the products to a deep frozen block and, subsequently, cutting or sawing the desired portions from the block, said portions being thereafter further processed to the desired commercial goods. When producing such fish products on the basis of fillets, it is necessary to employ methods other than the deep frozen block since these fish products are produced from relatively coarse cut fish, i.e. fillet pieces and the like, and the direct forming of the products into the shape of the finished commercial goods is extremely difficult.

The production of a deep frozen block involves extra expense in operational costs, packaging and storage.

Cutting the block by means of saws or knives entails a substantial waste, and an aim of the present invention is to reduce such waste caused by portioning.

The finished products may be punched out instead of cut or sawed. When punching however, it is necessary to soften the goods to a temperature suitable for punching, but without risk of damage to the goods. Foodstuffs which must keep for long periods of time, are usually frozen to a temperature of —25° or —30° C. in order to attain the necessary keeping quality of the products. When punching, which is preferably carried out on pre-frozen plates, the goods are easily crushed at these temperatures, and it is difficult to operate with such hard materials. As mentioned, the goods are usually softened by raising the temperature thereof to approximately —5° C., all according to the nature of the goods. The softening must be sufficient to allow the goods to be readily worked but only to the point where they retain their shape when subjected to treatment. This also entails substantial operational and storage expense, and the cost of the freezing is also greater since the product must be twice frozen to deep frozen state.

The object of the invention is to avoid the production of blocks or plates and all the expense incurred thereby with respect to operational costs, packaging, storage, etc. The usual waste, caused by portioning during further treatment of the block, is also avoided thereby and the complex technique of punching becomes unnecessary. As will be apparent hereinbelow, the invention also allows the possibility of greater variation in the shape and size desired in the finished product.

In accordance with the invention the raw material is ground to a mass consisting of grain size particles, which is formed into a band-like product and frozen to a consistency suitable for portioning into shaped products, the said portioning being undertaken thereafter and the portions are further frozen to the desired keeping temperature.

It has proved that division or grinding of the raw material into a mass consisting of grain sized particles involves no special disadvantages with respect to the consistency of the commercial product or the keeping quality thereof. Since the raw material is formed, in ground state, to a band-like product, it is possible to carry out production in a continuous production line. The portioning to shaped products may be undertaken expediently by means of punching whereby the waste caused by portioning is minimal. Freezing prior to portioning is regulated according to the portioning method employed. By punching the shaped products from the band-like product it is possible to vary the shape and size as desired, and without being restricted to straight-sided products. Subsequent to portioning, the temperature of the shaped products is further lowered by means of a final freezing operation to the desired keeping temperature, e.g. —30° C., and the deep frozen products may then be conveyed to optional further treatment, e.g. to a so-called dip and breading machine from which the products may be conveyed to a packing line.

The novel method of the invention offers significant advantages. In the first place it is possible to carry out the operation in a continuous process and the waste caused by portioning is reduced to a minimum whilst, at the same time, greater variation in the shape of the products is possible than was the case with previous methods. In the second place, the expense of freezing, operational costs, storage etc., is substantially reduced inasmuch as the necessity of intermediate storage of the deep frozen blocks or plates is eliminated, as is also the possible softening station for sheets which are to be punched.

A layout is illustrated diagrammatically on the drawing, and the invention is further described in the form of an embodiment example with reference to the figure of the drawing.

The so-called fish sticks are to be produced. The raw material, fish, is conveyed to a grinding machine 1 which grinds the raw material to a suitable mass of grain sized particles. From the grinding machine 1, the raw material thus threated is delivered directly onto a belt 2 which conveys the fish mass toward the right on the drawing. The fish mass is formed into a band of desired thickness by means of a forming means 3, known per se, which comprises the necessary forming shields and rolls. Subsequent to the shaping means, various means for control are indicated by the reference number 4, for example, transillumination for discovery of undesirable particles and removal thereof, and for patching of the mass to provide uniformity in the band form of the mass. Subsequent to control 4, the belt 2 now conveys the band-like fish mass into a freezing channel 5, preferably in the form of a radian freeze channel, and the fish mass is frozen therein to a temperature of —1° to —5° C. From the freezing channel 5 the frozen mass is conveyed to a punching machine 6 which punches out the portions of desired shapes and dimensions. The belt 2 then passes into a second freezing channel 7 wherein the fish portions are frozen to a temperature of between —15° and —20° C., for example. From this second freezing channel 7, the now deep frozen mass in punched formed is conveyed to a dip and breading machine 8 which is operating at a suitably adapted speed. From the dip and breading machine 8 the shaped products are conveyed to a packing line 9. The belt 2 is disinfected during its return.

By means of the novel method according to the invention it is possible to produce the desired shaped products in an inexpensive and efficient manner, the said products having good shape-retaining qualities in finished state and thus retain the shape intended. In the case of fish the protein thereof will provide the necessary binding quality, and this binding quality is retained in that the raw material is ground to a mass consisting of grain sized particles instead of being finely ground to a cream like mass. The binding quality of the protein is at least partly destroyed in such a cream-like mass, necessitating the addition of extra binding agent. This is a disadvantage, but the invention naturally comprises the use of such a mass also.

The most suitable temperature for treatment of the mass is between −1° and −2° C. for ordinary fish, but for certain products it may be −5° C. The range of −1° C. to −5° C. is therefore set forth as the most suitable. It is, in fact, possible to maintain a temperature as high as −1° to −2° C. when portioning, when the portioning operation is immediately followed by a further freezing. In the known methods of softening, by raising the temperature from −30° to −5° C., it is not possible to raise the temperature further since the portioning is not immediately followed by deep freezing but, on the contrary, is presumably followed by breading and/or packing, which would damage the goods entirely if the temperature was allowed to increase to approximately −2° C. The invention is of great significance here since the results of portioning at −1° to −2° C. are better than at −5° C.

Having described my invention, I claim:

1. The method of producing shaped, deep-frozen portions of foodstuff products, comprising grinding raw fish material and producing a fish mass therefrom consisting substantially of grain size particles, subjecting the said mass to a continuous series of operations including; forming said mass into a band-like fish mass of uniform thickness, conveying the band-like product as formed continuously through a first freezing zone and therein freezing it to a temperature of from about −1 to −5° C., thereby obtaining a consistency suitable for portioning of the frozen band-like product into shapes with minimal waste, portioning the resulting frozen band-like product at said temperature into shaped portions, and immediately after forming the shaped portions passing the same into a second freezing zone, and deep-freezing them to a keeping temperature below −15° C. to −30° C.

2. The method as claimed in claim 1, wherein the band-like product is chilled to a temperature of from −1° to −2° C.

3. The method as claimed in claim 1, wherein the raw fish material is reduced to a mass consisting of a grain-sized particles thereby promoting its binding quality during the forming of the band-like product.

References Cited

UNITED STATES PATENTS

| | | | |
|---|---|---|---|
| 1,864,284 | 6/1932 | Taylor | 99—195 |
| 2,027,255 | 1/1936 | Vogt et al. | 62—75 |
| 2,916,986 | 12/1959 | Lebovitz | 99—194X |
| 2,941,560 | 6/1960 | McCaffery | 146—78 |
| 3,296,812 | 1/1967 | Cloudy | 62—63 |
| 3,316,104 | 4/1967 | Lugiewicz | 99—194 |

NORMAN YUDKOFF, Primary Examiner

F. E. DRUMMOND, Assistant Examiner

U.S. Cl. X.R.

62—63; 99—194; 146—78

PO-1050
(5/69)

UNITED STATES PATENT OFFICE
CERTIFICATE OF CORRECTION

Patent No. 3,579,359        Dated May 18, 1971

Inventor(s) Eiler Schjolberg

It is certified that error appears in the above-identified patent and that said Letters Patent are hereby corrected as shown below:

Column 2, line 45, after "the" insert --single--.

Column 4, line 13 (Claim 1, line 16), cancel "below" and insert --of from--.

Signed and sealed this 1st day of August 1972.

(SEAL)
Attest:

EDWARD M. FLETCHER, JR.      ROBERT GOTTSCHALK
Attesting Officer             Commissioner of Patents